April 13, 1965     A. A. SEGAL     3,177,605
FISH LURE
Filed Feb. 28, 1964
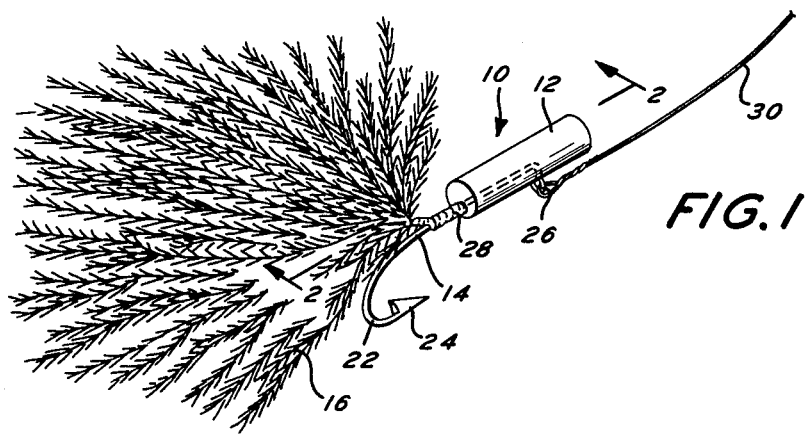
FIG.1
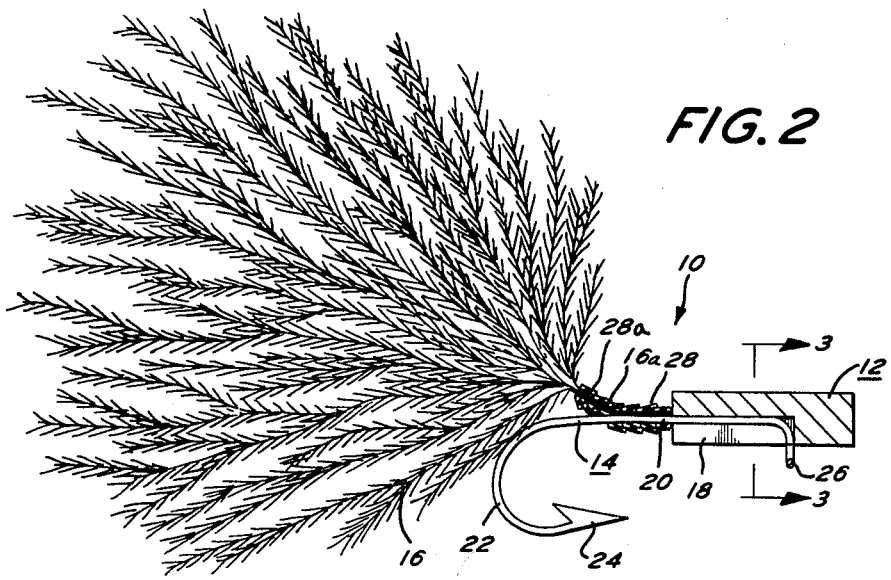
FIG.2
FIG.3 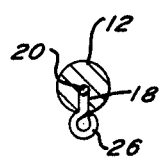 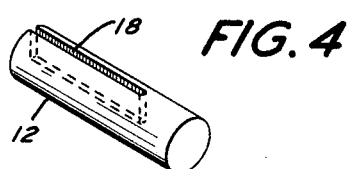 FIG.4
INVENTOR.
ABRAHAM A. SEGAL
BY
*Donald S. Cohen*
ATTORNEY

3,177,605
FISH LURE
Abraham A. Segal, 8300 Hull Drive, Wyndmoor, Pa.
Filed Feb. 28, 1964, Ser. No. 348,087
1 Claim. (Cl. 43—42.28)

The present invention relates to a fish lure, and more particularly to a fish lure constructed to create a teasing action that needles game fish into striking the lure.

In artificial bait fishing, the lure must be of a construction to attract the attention of the fish. I have found that it is not only the physical appearance of the lure but also its motion in the air or water which attracts the fish. Also, it is desirable that the lure be attractive to a number of different type of fish and can be used for various types of fishing, such as casting, trolling or jigging.

It is an object of the present invention to provide a novel fishing lure.

It is another object of the present invention to provide a fishing lure having an appearance and motion which is attractive to fish.

It is a further object of the present invention to provide a fishing lure which will attract various types of fish and can be used for various types of fishing.

Other objects will appear hereinafter.

For the purpose of illustrating the invention there is shown in the drawings a form which is presently preferred; it being understood, however, that this invention is not limited to the precise arrangements and instrumentalities shown.

FIGURE 1 is a perspective view of the fish lure of the present invention.

FIGURE 2 is a sectional view taken along line 2—2 of FIGURE 1.

FIGURE 3 is a sectional view taken along line 3—3 of FIGURE 2.

FIGURE 4 is a perspective view of the body of the lure of the present invention.

Referring to FIGURES 1 and 2 of the drawing, the fish lure of the present invention is generally designated as 10. Fish lure 10 comprises a metal body 12, a hook 14, and feathers 16.

The body 12 is a solid piece of metal, such as lead, which is circular in transverse cross-section. As shown in FIGURES 2 and 4, the body 12 has a slot 18 therein extending radially from the outer surface of the body to the longitudinal axis thereof. Slot 18 extends longitudinally along the body 12 from one end thereof, and is of a length two-thirds the length of the body.

As shown in FIGURE 2, hook 14 has a straight shank 20, a curved bill 22 at one end of the shank 20, a barb 24 at the end of the bill 22, and an eye 26. The eye 26 of the hook 14 is bent to extend substantially perpendicular from the shank 20 in the same direction as the bill 22 extends from the shank. As clearly shown in FIGURE 2, the plane of the eye 26 is perpendicular to the longitudinal axis of the shank 20.

The hook 14 is mounted on the body 12 with the eye end portion of the shank 20 fitting in the slot 18 in the body, and the eye 26 projecting radially beyond the surface of the body. With the shank 20 of the hook 14 seated in the slot 18 of the body 12, the sides of the slot are pressed together, such as with pliers or a similar tool, to clamp the hook tightly within the slot. Thus, the hook 14 is mounted on the body 12 with the shank 20 projecting from one end of the body and extending along the longitudinal axis of the body. The eye 26 of the hook 14 projects beyond the cylindrical surface of the body 12 with the plane of the eye being perpendicular to the longitudinal axis of the body.

The feathers 16 are preferably marabou feathers, and more preferably the webby portion of the marabou feathers. The feathers 16 are secured to the portion of the shank 20 of the hook 14 which is adjacent the end of the body 12 from which the shank projects. The clump of feathers 16 are gathered together at one end 16a and laid along the shank 20 of the hook starting at the end of the body 12. Starting at the end of the body 12, a thread 28 is helically wound around and along the shank 20 and the feather ends 16a to secure the feathers to the hook. The last three or four turns 28a of the thread 28 are wound along around the ends 16a of the feathers. This presses the feathers 16 away from the barb 24 of the hook 14.

In the use of the lure 10 of the present invention, the line 30 is tied to the eye 26 of the hook 14 as shown in FIGURE 1. I have found that the construction of the lure 10 of the present invention has a distinct motion which along with the physical appearance of the lure 10 is very attractive to various types of fish, such as bass, pike, pickerel, trout, crappie, white and yellow perch, shad, herring and scores of other fresh and salt water game fish. The distinct motion of the lure 10 of the present invention is created by the cylindrical shape of the body 12, by having the eye 26 of the hook 14 spaced from the end of the body 12 from which the hook shank 20 projects two-thirds the length of the body, and by having the plane of the eye 26 perpendicular to the longitudinal axis of the body 12, and by the texture of the feathers 16. The lure 10 of the present invention has been found to be successful in all types of fishing, such as casting, trolling and jigging. The lure 10 of the present invention has the appearance of shrimp or other water insects when the lure is fished close to the bottom.

The present invention may be embodied in other specific forms without departing from the spirit or essential attributes thereof, and accordingly, reference should be made to the appended claim, rather than to the foregoing specification as indicating the scope of the invention.

I claim:

A fish lure comprising a solid cylindrical metal body, a hook having a straight shank secured to said body and projecting from one end of said body, a curved bill on the free end of said shank and extending radially of said body beyond the periphery of the body, an eye projecting radially from the cylindrical surface of said body in the same direction as said bill, said eye being spaced from said one end of the body two-thirds the length of the body, the plane of said eye being perpendicular to the longitudinal axis of the body, feathers extending along the hook shank from said one end of the body toward the bill, and a thread wrapped around the feathers and the hook shank starting at the said one end of the body to secure the feathers to the hook, the last few turns of the thread extending only around the feathers on the side of the shank opposite the bill to hold the feathers away from the bill.

References Cited by the Examiner
UNITED STATES PATENTS

| | | | |
|---|---|---|---|
| 1,881,285 | 10/32 | Means | 43—42.27 |
| 2,315,304 | 3/43 | Upperman | 43—42.37 X |
| 2,589,007 | 3/52 | Landon | 43—42.28 |
| 3,037,316 | 6/62 | Zeeuw | 43—42.28 |

SAMUEL KOREN, *Primary Examiner.*

ABRAHAM G. STONE, *Examiner.*